April 5, 1938.   R. CHILTON   2,112,984
PENDULUM COUNTERWEIGHT
Filed Feb. 21, 1935   2 Sheets-Sheet 1
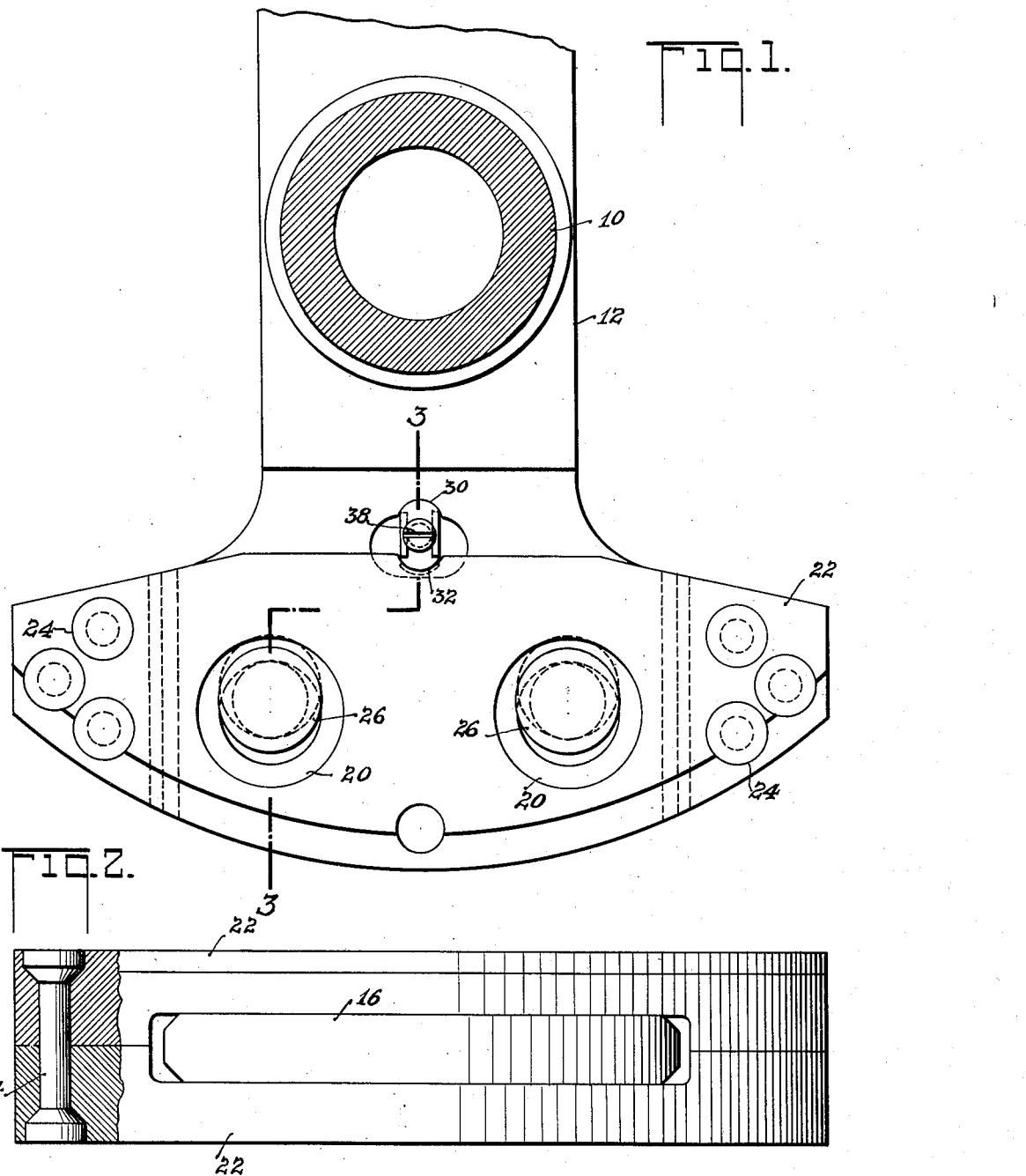
INVENTOR.
ROLAND CHILTON
BY
ATTORNEY.

April 5, 1938.                    R. CHILTON                    2,112,984
                           PENDULUM COUNTERWEIGHT
                          Filed Feb. 21, 1935                2 Sheets-Sheet 2
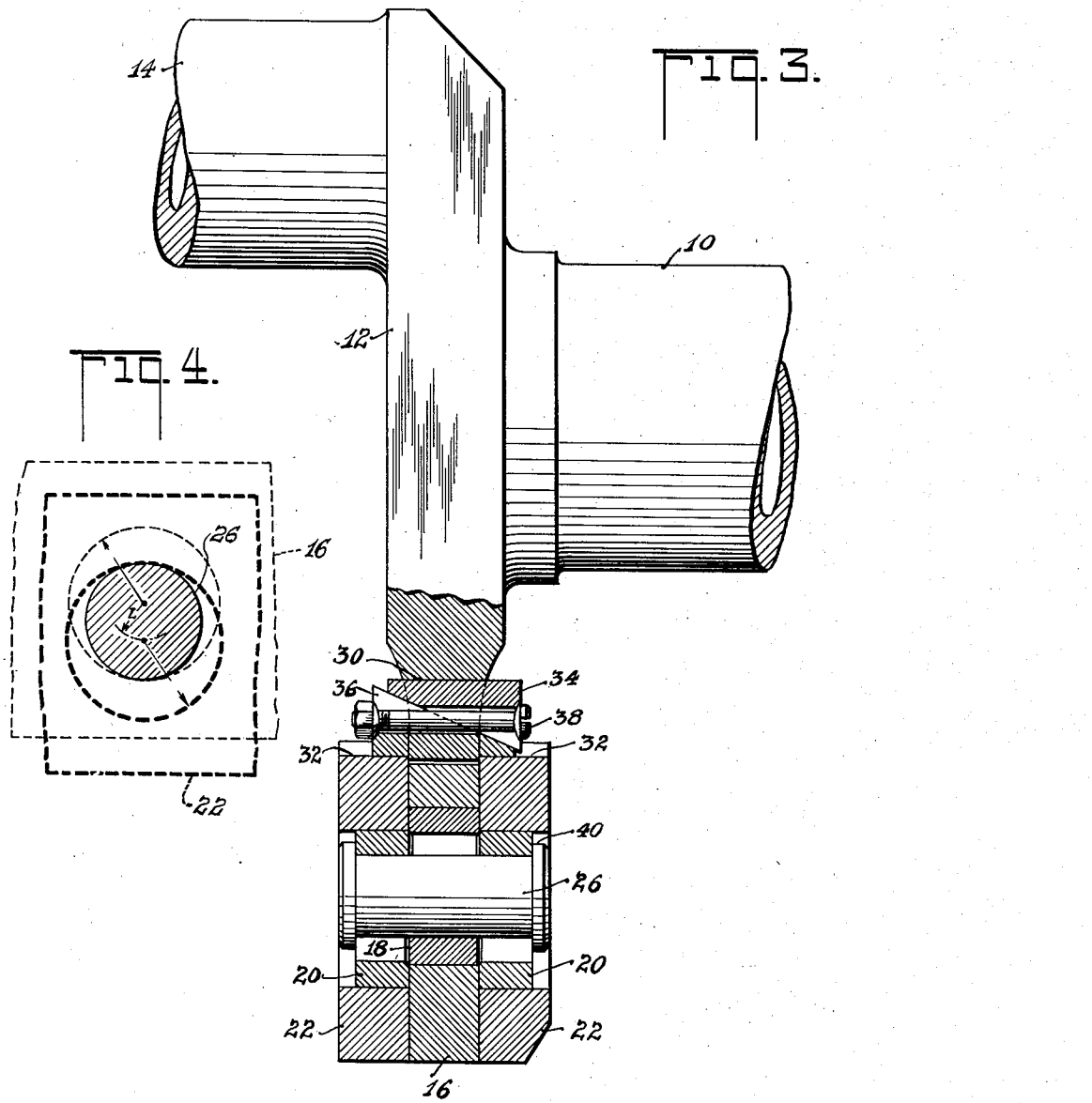
INVENTOR.
ROLAND CHILTON
BY
ATTORNEY.

Patented Apr. 5, 1938

2,112,984

UNITED STATES PATENT OFFICE 2,112,984

PENDULUM COUNTERWEIGHT

Roland Chilton, Ridgewood, N. J., assignor to The Reed Propeller Co., Inc., a corporation of New York Application February 21, 1935, Serial No. 7,475

18 Claims. (Cl. 74—603)

This invention relates to pendulum mechanisms, and specifically to an improved construction for a synchronous pendulum damper for torsional vibrations in an engine crankshaft.

It has previously been taught that the frequency of a pendulum associated with a fast rotating body varies with the speed of rotation whereby the pendulum makes a constant number of swings per revolution at all speeds of revolution. The torsional impulses or exciting forces to which engine crankshafts are subject, and which are apt to induce torsional vibrations, also comprise a fixed number of cycles per revolution. For example, the major exciting force in a 9-cylinder 4 cycle radial aircraft engine has a frequency of four and a half times per revolution and it has been known in the art that an oscillating mass having this frequency will, if suitably attached to the shaft, set up a force in opposition to the vibration, which may be damped by such means.

In the prior art the appropriate frequency has been obtained by a spring-restrained mass which has a constant frequency, regardless of crankshaft speed, and accordingly can only act as a resonant damper at one specific speed. Such spring-loaded masses, while effective at their specific speed of synchronism, are apt to induce additional vibrations in the system at other speeds. The centrifugally stabilized pendulum of Taylor, however, having a constant number of swings per revolution throughout the speed range, is equally effective at all points therein. The requirements, however, call for a pendulum of high frequency and relatively large mass requiring a "simple" pendulum length of only a fraction of an inch, which, with the masses required, means a pendulum wherein the point of support is within the body of the mass. As is well known, due to the large polar moment, such a mass acts as a "compound pendulum" in which the highest attainable frequency is much too slow for Taylor's purpose and the present invention comprises an improved means whereby a relatively large mass may be made to act as a simple pendulum of short length and high frequency.

Objects of the invention are to provide a pendulum torsional vibration damper for an engine crankshaft; to construct the normal crankshaft counterweights as a pendulum torsional vibration damper; to provide a simple mounting organization for a pendulum damper; to provide a weight oscillatable as a simple pendulum, rotatable with, and proportional in frequency to the speed of rotation of, a crankshaft; to provide a simple and improved method of pendulum support; and to afford a construction which will be relatively frictionless and suited to high centrifugal loads.

Further objects will be found in reading the specification and in viewing the drawings, in which:

Fig. 1 is an end elevation of a crank embodying the pendulum counterweight suspension of the invention;

Fig. 2 is a plan view of Fig. 1;

Fig. 3 is a fragmentary side view in partial section on the line 3—3 of Fig. 1, through one set of supporting roller holes; and Fig. 4 is a diagram showing the relation between the roller and the cooperating holes or roller tracks.

In these drawings, a crankshaft 10 includes a conventional cheek 12 and crankpin 14, the cheek being extended at 16 and bored out to receive hardened rings 18. Similar rings 20 are provided in heavy counterweight side plates 22 which are riveted together at 24 to slidably embrace the extension 16 as will be clear from Fig. 2. Loosely engaged in the bores of the rings 18, 20 are roller pins 26. The relation of these parts will be clear from the diagram of Fig. 4 wherein the dimension "L" designates the effective length of the simple pendulum comprised by the plates 22. This dimension "L" is the difference between the diameter of the bores of the rings 18, 20 and the rollers 26. It is a characteristic of this method of suspension wherein more than one point of support is provided, that all points on the weight move through the same arcuate path. In other words, if we consider the mass 22 vibrating relative to a fixed crankshaft, the motion consists of an arcuate swing without any rotational component, or alternatively, all positions of a given line on the weight are parallel and accordingly the weight has the characteristics of a mathematical or simple pendulum.

When the engine is running, the very large centrifugal force to which the pendulum counterweight is subject will maintain the rollers 26 against the outer part of the crankshaft rings 18 and against the inner part of the counterweight rings 20 and, to guard against looseness before the crankshaft gets into steady rotation, there is added an arcuate ended strut or compression link engaging arcuate pockets 30, 32 in the crankshaft and counterweight, respectively. This stabilizing link is made adjustable as will be seen in Fig. 3 from the wedged disposition of its two portions 34, 36 which are adapted to be drawn up by the adjusting bolt 38 until the entire assembly is brought to zero backlash.

In operation, the pendulum mass is acted upon by centrifugal force which amounts to many times the gravitational righting force acting on a normal pendulum having a stationary point of suspension, and accordingly the pendulum has a much higher frequency and one which increases in proportion to the crankshaft speed. If "$n$" be the required pendulum frequency in swings per crankshaft revolution and "$R$" be the radius from the center of rotation to the center of gravity of the pendulum weight, then the required pendulum length $$L = \frac{R}{n^2}$$

which is true only for a simple pendulum, i. e., one which swings without rotational component, as provided in the suspension of this invention.

The above formula has been found to be correct when applied in connection with massive counterweights which oscillate through only a few degrees of arc relative to the crankshaft, wherein the period desired is on the order of four and a half oscillations per crankshaft revolution. For variant embodiments of the invention, it is conceivable that this formula may need to be expanded for precise results, so that the formula as given is in no way intended to be a limitation as to the method of calculating or determining the proper pendulum length.

As will be noted in Fig. 3, the rollers 26 are provided with flanged ends 40 of a diameter slightly less than the bores of the rings 18 and 20. The roller length is substantially equal to the thickness of the counterweight 22, the rings 20 being inset to permit the thickness of the whole assembly to be that of the counterweight. Disassembly is accomplished by loosening the bolt 38, removing the strut parts 34—36, aligning the rings 18—20 and removing the rollers 26, after which the counterweight may be slid off the cheek extension 16.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. Means for providing high frequency in a pendulum of large mass comprising the combination with the mass of a support member, rolling means engaging bores formed in the mass and in the support member, each of said bores being sufficiently larger than the roller to give the desired pendulum length.

2. A crankshaft damper including a crank cheek extension having arcuate tracks therein, a counterweight mass having arcuate tracks, and rollers each loosely engaging one of said mass tracks and one of said extension tracks, said rollers having radii smaller than the radii of the arcs of said arcuate tracks.

3. The combination with an engine crankshaft, of a crank cheek extension having more than one arcuate track, a counterweight mass embracing said extension and movable circumferentially relative thereto, and having similar arcuate tracks, and rollers of lesser diameter than that represented by the arcuity of said tracks, each engaging associated extension and mass tracks.

4. A crankshaft damper including a crank cheek extension having an opening, the edge of said opening remote from the shaft center comprising an arcuate track, a balancing mass having an opening for approximate alignment with said extension opening, the edge of said mass opening toward the shaft center comprising an arcuate track, and a roller pin loosely engaging in said openings and bearing on said tracks, said roller pin having a diameter less than the diameter of said arcuate tracks.

5. A dynamic pendulum counterweight comprising in combination a shaft extension having arcuate tracks, a counterweight having similar arcuate tracks, a roller engaged with and between said tracks so that the centers of curvature thereof are on diametrically opposed sides of the roller center, and demountable means normally preventing alignment of said centers.

6. In a pendulum mount for a relatively large mass movable with and with respect to an engine crankshaft, the combination with said mass and crankshaft of rollers engaging in circular bores formed in the crankshaft and in the mass, said rollers having a lesser diameter than said bores and the difference in said diameters being the effective pendulum length, and a strut bearing at its ends on said crankshaft and mass for holding said rollers in contact with the radially inner surfaces of said mass bores and with the radially outer surfaces of said shaft bores.

7. The combination with a crank extension member and a counterweight member, one embracing the other for relative circumferential movement, and each said member being provided with an arcuate track, of a transverse pin rollably engaging said tracks and having flanges preventing axial displacement of the pin when the parts are in operative position, but adapted to pass said tracks when the same are brought into appropriate alignment.

8. A support means for a large pendulum mass having a short pendulum length comprising the combination with said mass of a support therefor, the mass and the support each having a bore therein, said bores having parallel spaced axes, and a roller of less diameter than the bores loosely engaged therein.

9. In an engine crankshaft, a crankcheek having an extension opposite the crankpin of the crankshaft, said extension having formed therein a through opening within which there is defined an arcuate track, and a torsional vibration damper for said crankshaft including a freely rollable roller member extended through and axially located within said opening to freely roll along said track, said roller member having a diameter substantially less than the diameter of said opening, and means to axially locate said roller member relatively to said track comprising a part carried by said roller member.

10. In an engine crankshaft, a crankcheek having an extension opposite the crankpin of the crankshaft, said extension having formed therein a through opening, and a combined counterweight and torsional vibration damper for said crankshaft including a roller member and a shiftable counterweight mass carried thereby, said roller member being freely rollable within, extended through and of a diameter less than the diameter of said opening, and said shiftable counterweight mass having its weight distributed substantially equally on opposite sides of said extension and at opposite ends of said roller member.

11. A torsional vibration damper for an engine crankshaft having a crankcheek and a crankcheek extension, said damper comprising an inertia mass shiftable in its relation to said crankcheek extension, said crankcheek extension and said shiftable mass each having formed therein an opening, which said openings are partially aligned, and a connection between said crankcheek extension and said shiftable mass including a roller member freely rollable within and extended through both of and of less diameter than either of said partially aligned openings.

12. A synchronous torsional vibration damper for an engine crankshaft having a crankpin, said damper comprising a bored crankcheek extension within the bore of which there is provided an arcuate track, a roller member in said bore, said roller member having a radius less than the radius of said track whereby the roller member is freely rollable on said track, and a counterweight mass carried by said roller member and embracing said extension, said roller member and counterweight mass being freely pendularly movable with respect to said crankshaft, and the difference between the radii of said track and roller member being of such magnitude as to establish a pendulum length for said counterweight mass to provide a centrifugally stabilized pendulum having a fixed number of swings per crankshaft revolution.

13. A vibration damper for rotating shafts comprising two elements one of which is a shiftable inertia mass, the said elements having a plurality of sets of partially aligned openings therein and being connected by a plurality of spaced freely rolling members one positioned in each set of openings and of less diameter than any of the openings of said set.

14. A vibration damper for a rotating shaft, comprising two elements including a member adapted to be connected to said shaft and a movable inertia mass, said elements having a plurality of sets of partially aligned openings therein, and a plurality of spaced freely rolling members one positioned in each set of openings and of less diameter than any of the openings of the set.

15. A device for reducing vibrations of a moving part, comprising two elements including a mass and a member connected to the moving part, both of said elements having openings therein to form runways, and a freely rolling body of less diameter than either of said openings extending through said openings.

16. In an engine crankshaft, a crankcheek having an extension opposite the crankpin of the crankshaft, said extension having formed therein a through opening defining a track, and a torsional vibration damper for said crankshaft comprising a member extending through said opening and freely rollable within and of a diameter substantially less than the diameter of said opening, and means to axially locate said roller member relatively to said opening comprising a part carried by said member.

17. A support means for achieving the properties of a simple pendulum in a large pendulum mass comprising the combination with said mass of a support therefor, the mass and the support having sets of approximately aligned bores and a roller loosely engaged in each set of bores.

18. A mounting arrangement for a body adapted to have the oscillatory properties of a simple pendulum, comprising a support for said body and two or more arcuate bores in said body with corresponding arcuate bores in the support, rollers being provided extending through said body and support which engage loosely in said bores.

ROLAND CHILTON.